United States Patent [19]

Najafi et al.

[11] Patent Number: 4,963,177
[45] Date of Patent: Oct. 16, 1990

[54] METHOD FOR MAKING A GRATING ASSISTED OPTICAL WAVEGUIDE DEVICE

[75] Inventors: Seyed-Iraj Najafi, Dollard des Ormeaux; Kenneth O. Hill, Kanata; Francois Bilodeau; Derwyn C. Johnson, both of Nepean, all of Canada

[73] Assignee: Canadian Patents and Development Limited/Societe Canadienne des Brevets et d'Exploitation Limitee, Ottawa, Canada

[21] Appl. No.: 366,445

[22] Filed: Jun. 15, 1989

[30] Foreign Application Priority Data

Aug. 24, 1988 [CA] Canada .................................. 575573

[51] Int. Cl.⁵ .............................................. C03C 21/00
[52] U.S. Cl. ................................. 65/30.13; 350/96.19; 65/3.14
[58] Field of Search ..................... 350/96.19; 65/30.13, 65/30.1, 3.14

[56] References Cited

U.S. PATENT DOCUMENTS

| | | | |
|---|---|---|---|
| 4,695,121 | 9/1987 | Mahapatra et al. | 350/96.12 |
| 4,747,654 | 5/1988 | Yi-Yan | 350/96.19 |
| 4,756,734 | 7/1988 | Kersten | 65/30.1 |
| 4,842,629 | 6/1989 | Clemens | 65/30.13 |

FOREIGN PATENT DOCUMENTS 60-17727  1/1985  Japan .

OTHER PUBLICATIONS

Electronics Letters, Jun. 18, 1987, vol. 23, No. 13, pp. 668–669, "New Design Concept for a Narrowband Wavelength-Selective Optical Tap and Combiner".
IEEE Journal of Quantum Electronics, vol. QE-22, No. 6, Jun. 1986, "Planar, Buried, Ion-Exchanged Glass Waveguides: Diffusion Characteristics", by Ramu V. Ramaswamy and S. Iraj Najafi.

Primary Examiner—Kenneth M. Schor
Attorney, Agent, or Firm—Foley & Lardner, Schwartz, Jeffery, Schwaab, Mack, Blumenthal & Evans

[57] ABSTRACT

The present disclosure makes a grating assisted optical waveguide device. The method includes cleaning a substrate made of glass by means of cleaning agents; depositing a first layer made of metal onto a surface of the substrate by an evaporation process; forming a first mask by making openings in the first layer to expose first parts of the surface, the first mask being formed by a photolithographic process; immersing the substrate in a first bath of molten salt having a first preselected temperature to make a waveguide by increasing the refractive index of the glass in the first parts by an ion-exchange process; removing the first mask from the surface; immersing the substrate in a second bath of molten salt in order to bury the waveguide; depositing a second layer made of metal on the surface of the substrate by an evaporation process; forming a second mask by making openings in the second layer to expose second parts of the surface, the second mask being formed by a photolithographic process; immersing the substrate in a third bath of molten salt having a third preselected temperature to change the refractive index of the glass in the second parts by an ion-exchange process in order to form a grating, the refractive index obtained in this third immersing step being different from the refractive index obtained in the first immersing step, the third preselected temperature being lower than the first preselected temperature to avoid further diffusion of ions diffused in substrate in the first bath; and removing the second mask from the surface to obtain the grating assisted optical waveguide device.

9 Claims, 2 Drawing Sheets

METHOD FOR MAKING A GRATING ASSISTED OPTICAL WAVEGUIDE DEVICE

FIELD OF THE INVENTION

The present invention relates to a method for making an optical waveguide device. More particularly, the present method can be used for making grating assisted optical waveguide devices.

BACKGROUND OF THE INVENTION

Since the first attempt to fabricate ion-exchanged glass waveguides by T. Izawa and H. Nakagome, "Optical waveguides formed by electrically induced migration of ions in glass plates", Appl. Phys. Lett., Vol. 21, p. 584, 1972, investigators have tried to obtain guidance by exchanging Na+ in glass by monovalent ions such as Li+ as described by T. Findakly, "Glass Waveguides by ion-exchange: a review", Optical eng., Vol. 24, p. 244, 1985; Ag+ as described by T. G. Giallorenzi, E. J. West, R. Kirk, R. Ginther and R. A. Andrews, "Optical Waveguides formed by thermal migration of ions in glass", Appl. Opt., Vol. 12, p. 1240, 1973; K+ as described by Y. H. Won, P. C. Jaussaud and G. H. Chartier, "Three-Prism loss measurement of optical waveguides", Appl. Phys Lett., Vol. 37, p. 269, 1980; Cs+ as described by V. Neuman, O. Parriaux and. L. M. Walpital, "Double alkali effect: influence on index profile of ion-exchanged waveguides", Electron, Lett, Vol. 15, p. 704, 1979; and Tl+ as described by E. Okuda, H. Wada and Y. Yamasaki, Paper Th86, Technical Digest of Topical Meeting on Integrated and Guided Wave Optics, Washington, D.C., 1984. Among these ions, K+, Cs+ and Ag+ are suitable for single-mode waveguide fabrication because of their small diffusion coefficient and index change in glass.

OBJECTS OF THE INVENTION

An object of the present invention is to provide a method suitable for mass production of grating assisted optical waveguide devices.

Another object of the present invention is to provide an inexpensive method for producing such grating assisted optical waveguide devices.

The objects, advantages and other features of the present invention will become more apparent upon reading of the following non restrictive description of a preferred embodiment thereof, given for the purpose of exemplification only with reference to the accompanying drawings.

SUMMARY OF THE INVENTION

According to the present invention, there is provided a method for making a grating assisted optical waveguide device, comprising the steps of:

(a) cleaning a substrate made of glass by means of cleaning agents;

(b) depositing a first layer made of metal onto a surface of said substrate by an evaporation process;

(c) forming a first mask by making openings in said first layer to expose first parts of said surface, said first mask being formed by a photolithographic process;

(d) immersing said substrate in a first bath of molten salt having a first preselected temperature to make a waveguide by increasing the refractive index of said glass in said first parts by an ion-exchange process;

(e) removing said first mask from said surface;

(f) immersing said substrate in a second bath of molten salt having a second preselected temperature in order to bury the waveguide;

(g) depositing a second layer made of metal on said surface of said substrate by an evaporation process;

(h) forming a second mask by making openings in said second layer to expose second parts of said surface, said second mask being formed by a photolithographic process;

(i) immersing said substrate in a third bath of molten salt having a third preselected temperature to change the refractive index of said glass in said second parts by an ion-exchange process in order to form a grating; the refractive index obtained in said step (i) being different from the refractive index obtained in said step (d), said second preselected temperature being lower than said first preselected temperature to avoid further diffusion of ions diffused in the substrate in said step (d); and (j) removing said second mask from said surface to obtain said grating assisted optical waveguide device.

DETAILED DESCRIPTION OF A PREFERRED EMBODIMENT

Figure 1:
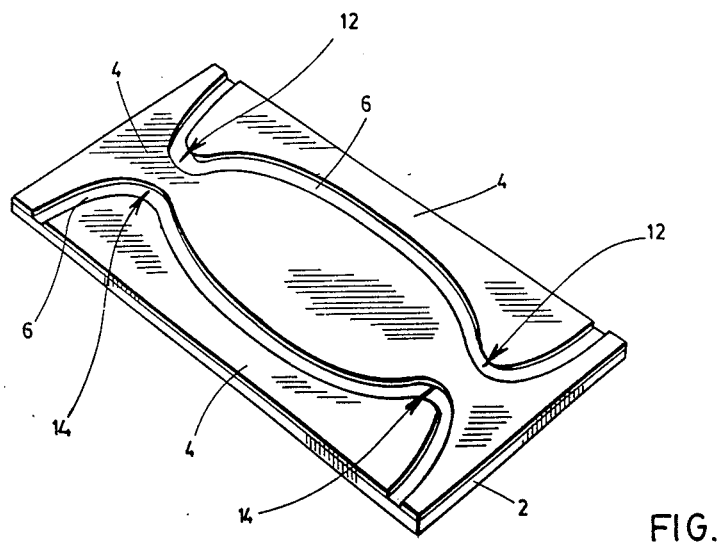
FIG. 1 is a perspective view of a substrate covered by a first mask according to the present invention.

By means of the FIGS. 1 and 2, the method for making a grating assisted optical waveguide device is described below. The method comprises the steps of cleaning a substrate 2 made of glass by means of cleaning agents which can be soap, trichloroethane, acetone and methanol; depositing a first layer of aluminum onto a surface of the substrate by an evaporation process; forming a first mask 4 by making openings in the first layer to expose first parts 6 of the surface, the first mask 4 being formed by a photolithographic process; immersing the substrate 2 in a first bath of molten salt comprising potassium nitrate and having a temperature of 400° C. to form a waveguide by increasing the refractive index of the glass in the first parts 6 by $K^+$—$Na^+$ exchange process; removing the first mask 4 from the surface by immersing the substrate 2 in an acid bath; and immersing the substrate in a molten bath of sodium nitrate of 400° C. in order to bury the waveguide.

The method comprises also the steps of depositing a second layer made of aluminum on the surface of the substrate 2 by an evaporation process; forming a second mask 8 by making openings in the second layer to expose second parts 10 of the surface, the second mask 8 being also formed by a photolithographic process; immersing the substrate 2 in a third bath of molten salt comprising silver nitrate and having a temperature of 250° C. to change the refractive index of the glass in the second parts 10 by an ion-exchange process in order to make a grating, the diffusion coefficient of potassium being negligible at this temperature, the refractive index obtained in this third ion-exchange process being different from the refractive index obtained in the first ion-exchange process, the temperature of the third bath being lower than the temperature of the first bath to avoid further diffusion of ions diffused in substrate during the first immersion; and removing the second mask 8 from the surface by immersing the substrate in an acid bath to obtain the grating assisted optical waveguide device.

As it can be seen on FIG. 1, the first mask 4 has a specific shape. The exposed parts 6 of the surface comprise two longitudinal sections, each section having two extremities adjacent to the edge of the surface. One section having two areas 12 adjacent to two areas 14 of the other section.

Figure 2:
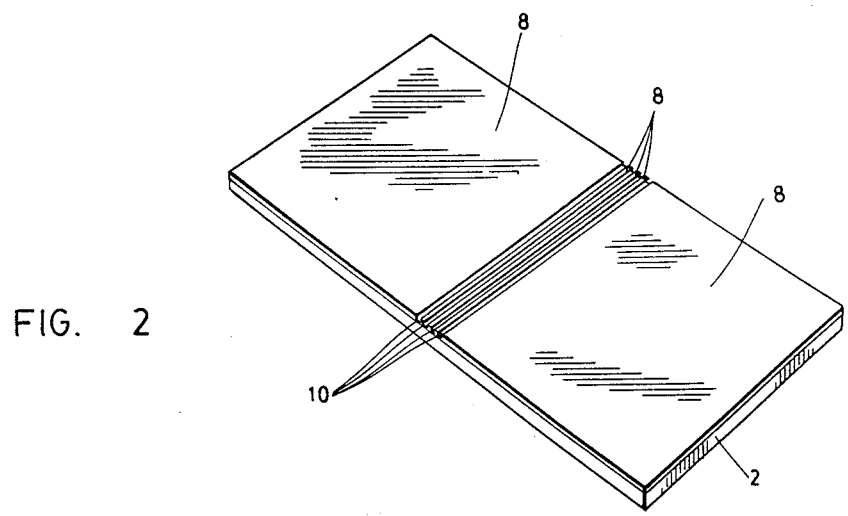
FIG. 2 is a perspective view of the substrate covered by a second mask according to the present invention.

As it can be seen on FIG. 2, the second mask has also a specific shape. The second exposed parts 10 of the surface comprise portions of the first exposed parts 6 of the surface. These portions are situated on each section of the first exposed parts 6 between the two areas 12 and 14.

The present method can be carried out by means of three general steps. in the first step, a waveguide structure is fabricated by potassium ion exchange in glass. In the second step, the waveguide is burried in the substrate. In the third step, the grating is made by silver ion exchange. The openings of the first mask 4 correspond to the waveguide structure. When the structure is immersed in the first bath of molten salt, the waveguide is achieved by means of the $K^+$—$Na^+$ exchange through the openings.

The openings of the second mask 8 are for grating fabrication. When the substrate is immersed in the third bath of molten salt, the grating is achieved by $Ag^+$—$Na^+$ and $Ag^+$—$K^+$ exchange through the openings.

The substrate can be chosen from different brands of soda-lime and borosilicate glasses.

Figure 3:
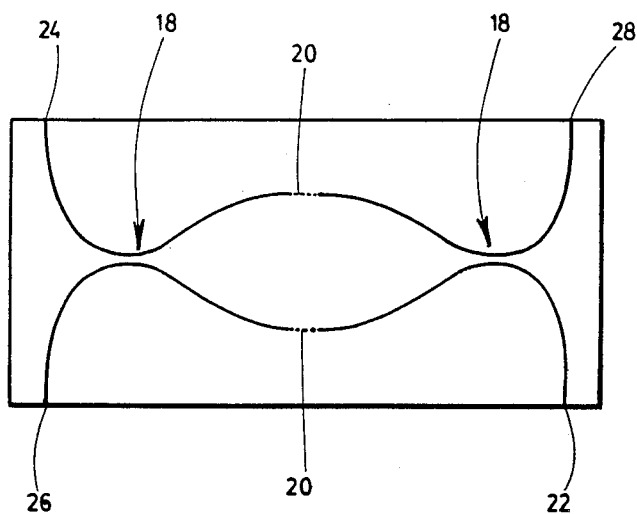
FIG. 3 is a view from above of the grating assisted optical waveguide device produced by means of the masks shown in FIGS. 1 and 2.

Referring now to FIG. 3, there is shown a narrowband wavelength tap and combiner, this waveguide consists of two 3dB directional couplers 18 connected to optical waveguides to form an interferometer in a MachZehnder configuration. Two identical Bragg gratings 20 forms balanced distributed feedback reflection filter on the two optical waveguide arms of the interferometer. This device can be used as wavelength multiplexer and demultiplexer. The grating is designed to satisfy the Bragg resonant condition $\lambda_0 = 2N\Lambda$. Where, $\lambda_0$ = resonant wavelength, N = effective index of guided mode, $\Lambda$ = grating period.

When the device is used as a multiplexer, one or more signals, having different wavelengths if there are more than one signal, are injected into input 22. These signals exit at the output 24. A new signal having a wavelength of $\lambda_0$ which is the resonant wavelength for the Bragg grating, is injected into input 26 to be added to the output 24.

When this device is used as a demultiplexer, two or more signals, one having a wavelength of $\lambda_0$, are injected into input 22. The signal having the wavelength of $\lambda_0$ exits from the input 28 while the other signals exit from the output 24.

Although, the present invention has been explained hereinabove by way of a preferred embodiment thereof, it should be pointed out that any modification to this preferred embodiment, within the scope of the appended claims is not deemed to change or alter the nature and scope of the invention.

The embodiments of the invention in which an exclusive property or privilege is claimed are defined as follows:

1. A method for making a grating assisted optical waveguide device, comprising the steps of:
   (a) cleaning a substrate made of glass having exchangeable cations by means of cleaning agents;
   (b) depositing a first layer made of metal onto a selected surface of said substrate by an evaporation process;
   (c) forming a first mask by making openings in said first layer to expose first parts of said surface in a pattern for forming waveguides, said first mask being formed by a photolithographic process;
   (d) immersing said substrate in a first bath of molten salt having a first preselected temperature to form waveguides by increasing the refractive index of glass immediately below said first parts of said surface by an ion-exchange in which refractive index increasing cations enter the glass through said openings in the first mask and replace said exchangeable cations;
   (e) withdrawing said substrate from said first bath and then removing said first mask from said selected surface;
   (f) immersing said substrate in a second bath of molten salt having a second preselected temperature and being a source of ions which will provide the same refractive index as the overall refractive index of the substrate to bury the waveguides by diffusion of cations away from said selected surface of said substrate;
   (g) withdrawing said substrate from said second bath and then depositing a second layer made of metal on said surface of said substrate by an evaporation process;
   (h) forming a second mask by making openings in said second layer to expose second parts of said surface in a pattern for forming a grating, said second mask being formed by a photolithographic process;
   (i) immersing said substrate in a third bath a molten salt having a third preselected temperature to change the refractive index of said glass below said second parts of said surface by an ion-exchange in which grating effecting ions enter the glass through the openings in the second mask and replace both said exchangeable ions and said index increasing ions in said glass substrate, the refractive index obtained in said step (i) being different from the refractive index obtained in said step (d), said third preselected temperature being sufficiently lower than said first preselected temperature such that diffusion of said index increasing ions in the glass does not occur; and
   (j) withdrawing said substrate from said third bath and then removing said second mask from said surface to obtain said grating assisted optical waveguide device.

2. Method according to claim 1, wherein said first parts of said surface comprise two longitudinal sections, each section has two extremities adjacent to the edge of said surface, one section having two areas sufficiently adjacent to two areas of the other section for coupling of wave energy.

3. Method according to claim 2, wherein said second parts of said surface comprise portions of said first parts, said portions being situated on each section of said first parts between said two adjacent areas.

4. Method according to claim 1, wherein said metal is aluminum.

5. Method according to claim 1, wherein said cleaning agents consist of soap, trichloroethane, acetone and methanol.

6. Method according to claim 1, wherein said first bath of molten salt comprises potassium nitrate, and said third bath of molten comprises silver nitrate.

7. Method according to claim 1, wherein said first and second preselected temperature are approximately 400°, and said third preselected temperature is approximately 250° C.

8. Method according to claim 1, wherein said third bath includes a molten salt selected from the group consisting of $AgNO_3$, $AgNO_3:TlNO_3$ and $NaNO_3:TlNO_3$.

9. Method according to claim 1, 2 or 3, wherein said obtained grating assisted optical waveguide is a narrow-band wavelength tap and combiner.

* * * * *